US007826396B2

(12) United States Patent
Miller et al.

(10) Patent No.: US 7,826,396 B2
(45) Date of Patent: Nov. 2, 2010

(54) SYSTEM AND METHOD FOR IMPLEMENTING PNRP LOCALITY

(76) Inventors: John L. Miller, 4 College Fields, Cambridge (GB) CB41YZ; Manuel Costa, 27 Weavers Field, Girton, Cambridge (GB) CB3 0XB; Noah Horton, 1836 232nd Ct. NE., Sammamish, WA (US) 98074; Christian Huitema, 9645 NE. 32nd St., Clyde Hill, WA (US) 98004; Sandeep K. Singhal, 731 16th Ave. West, Kirkland, WA (US) 98033

( * ) Notice: Subject to any disclaimer, the term of this patent is extended or adjusted under 35 U.S.C. 154(b) by 869 days.

(21) Appl. No.: 11/072,525

(22) Filed: Mar. 7, 2005

(65) Prior Publication Data

US 2006/0209704 A1   Sep. 21, 2006

(51) Int. Cl.
*H04L 12/28* (2006.01)
*G01R 31/08* (2006.01)

(52) U.S. Cl. ............... 370/255; 370/238; 370/252; 370/400

(58) Field of Classification Search ............ 370/252, 370/255, 238, 352; 709/243, 217, 223, 249; 375/261; 382/209; 700/90; 713/156
See application file for complete search history.

(56) References Cited

U.S. PATENT DOCUMENTS

| | | | | |
|---|---|---|---|---|
| 4,731,799 A | * | 3/1988 | Longstaff et al. | ........... 375/261 |
| 4,874,963 A | * | 10/1989 | Alspector | .................... 706/34 |
| 5,293,457 A | | 3/1994 | Arima et al. | |
| 5,307,289 A | * | 4/1994 | Harris | ........................ 700/90 |
| 5,471,580 A | * | 11/1995 | Fujiwara et al. | ............ 709/249 |
| 6,725,281 B1 | | 4/2004 | Zintel et al. | |
| 6,779,004 B1 | | 8/2004 | Zintel | |
| 6,892,230 B1 | * | 5/2005 | Gu et al. | ..................... 709/220 |
| 6,947,386 B2 | * | 9/2005 | Temudo de Castro et al. | .......................... 370/238 |
| 2002/0027569 A1 | | 3/2002 | Manni et al. | |
| 2002/0101860 A1 | * | 8/2002 | Thornton et al. | ............ 370/352 |
| 2002/0112058 A1 | | 8/2002 | Weisman et al. | |
| 2002/0143989 A1 | * | 10/2002 | Huitema et al. | ............. 709/243 |
| 2003/0055892 A1 | * | 3/2003 | Huitema et al. | ............. 709/204 |
| 2003/0056093 A1 | * | 3/2003 | Huitema et al. | ............. 713/156 |

(Continued)

OTHER PUBLICATIONS

"Predicting Internet Network Distance with Coordinates-Based Approaches", by T.S. Eugene Ng and Hui Zhang, INFOCOM 2002, Twenty-First Annual Joint Conference of teh IEEE Computer and Communication Societies, Proceedings, IEEE, vol. 1, p. 170-179, 2002.*

(Continued)

*Primary Examiner*—Kwang B Yao
*Assistant Examiner*—Jutai Kao
(74) *Attorney, Agent, or Firm*—Marshall, Gerstein & Borun LLP

(57) ABSTRACT

A method is provided for a host node in a computer network to determine its coordinates in a d-dimensional network space, comprising discovering an address of a peer node in the network, measuring network latency between the host node and the peer node, determining whether network latency has been measured for at least d+1 peer nodes, where, if network latency has not been measured for at least d+1 peer nodes, estimating the network coordinates of the host node, and where, if network latency has been measured for at least d+1 peer nodes, calculating the network coordinates of the host node using d+1 measured latencies.

18 Claims, 4 Drawing Sheets

U.S. PATENT DOCUMENTS

| | | | |
|---|---|---|---|
| 2003/0056094 A1* | 3/2003 | Huitema et al. | 713/157 |
| 2003/0097425 A1 | 5/2003 | Chen | |
| 2003/0117433 A1 | 6/2003 | Milton et al. | |
| 2003/0204742 A1* | 10/2003 | Gupta et al. | 713/200 |
| 2004/0062443 A1* | 4/2004 | Yen et al. | 382/209 |
| 2004/0111469 A1 | 6/2004 | Manion et al. | |
| 2004/0148333 A1 | 7/2004 | Manion et al. | |
| 2004/0249907 A1* | 12/2004 | Brubacher et al. | 709/220 |
| 2004/0255029 A1* | 12/2004 | Manion et al. | 709/227 |
| 2004/0259571 A1* | 12/2004 | Joshi | 455/456.1 |
| 2004/0260800 A1* | 12/2004 | Gu et al. | 709/223 |
| 2005/0022210 A1* | 1/2005 | Zintel et al. | 719/318 |
| 2005/0044195 A1* | 2/2005 | Westfall | 709/223 |
| 2005/0074018 A1 | 4/2005 | Zintel et al. | |
| 2005/0097503 A1 | 5/2005 | Zintel et al. | |
| 2005/0157659 A1* | 7/2005 | Huitema | 370/254 |
| 2006/0050651 A1* | 3/2006 | Brignone et al. | 370/254 |

OTHER PUBLICATIONS

Ng, T. S. Eugene and Hui Zhang, "A Network Positioning System for the Internet," *USENIX Annual Technical Conference 2004*, Boston, MA, Jun. 2004.

Ng, T. S. Eugene and Hui Zhang, "Predicting Internet Network Distance with Coordinates-Based Approaches," *INFOCOM'02*, New York, NY, Jun. 2002.

Ng, T. S. Eugene and Hui Zhang, "Towards Global Network Positioning," *Extended Abstract, ACM SIGCOMM Internet Measurement Workshop 2001*, San Francisco, CA, Nov. 2001.

Ng, T. S. Eugene and Hui Zhang, "Global Network Positioning: A New Approach to Network Distance Prediction," *Student Poster, SIGCOMM'01*, San Diego, CA, Aug. 2001.

Costa, Manuel, Miguel Castro, Antony Rowstron, and Peter Key "PIC: Practical Internet Coordinates for Distance Estimation," *ICDCS 2004* (Mar. 2004).

Dabek, Frank, Russ Cox, Frans Kaashoek, Robert Morris, "Vivaldi: A Decentralized Network Coordinate System," *SIGCOMM 2004*, Aug. 2004.

Cox, Russ, Frank Dabek, Frans Kaashoek, Jinyang Li, Robert Morris, "Practical Distributed Network Coordinates," *HotNets Workshop*, 2003.

U.S. Appl. No. 10/696,776, filed Oct. 30, 2003, Huitema et al.

"Genetic algorithm," http://www.google.com/search?sourceid-navclient&ie-UTF-8&rls-GGLG,GGLG:2005-3 (Mar. 2006).

"Peer-to-Peer Infrastructure: Creating a Group Chat Application," Microsoft, http://msdn.microsoft.com/library/en-us/p2psdk/p2p/creating_a_group_chat_application.asp...

"Genetic algorithm," http://en.wikipedia.org/wiki/Genetic_algorithm (Mar. 2006).

"Peer-to-Peer Infrastructure: Grouping API Functions," Microsoft, http://msdn.microsoft.com/library/en-us/p2psdk/p2p/grouping_api_functions.asp?frame=true.

"Neural Network," Wikipedia Encyclopedia, http://en.wikipedia.org/wiki/Neural_network (Mar. 16, 2006).

"Latency," http://whatis.techtarget.com/definition/0,,sid9_gci212456,00.html (Mar. 2006).

"Peer-to-Peer Infrastructure: PeerGroupEnumMembers," Microsoft, http://msdn.microsoft.com/library/en-us/p2psdk/p2p/peergroupenummembers.asp?frame=true.

"Explorations in Parallel Distributed Processing," McClelland et al., The Massachusetts Institute of Technology, 1988.

Zhang et al. "Brushwood: Distributed Trees in Peer-to-Peer Systems" (Mar. 2006).

"The Cable Guy—Nov. 2003: Windows Peer-to-Peer Networking," Microsoft Technet, http://www.microsoft.com/technet/community/columns/cableguy/cg1103.mspx.

"Peer-to-Peer Infrastructure: Identity Manager Functions," Microsoft, http://msdn.microsoft.com/library/en-us/p2psdk/p2p/identity_manager_functions.asp?frame.

"Distributed hash table," http://en.wikipedia.org/wiki/Distributed_hash_table (Mar. 2006).

"Artificial Neural Network," Wikipedia Encyclopedia, http://en.wikipedia.org/wiki/Artificial_neural_network (Mar. 14, 2006).

* cited by examiner

SYSTEM AND METHOD FOR IMPLEMENTING PNRP LOCALITY

FIELD OF THE INVENTION

This invention pertains generally to a coordinate-based mechanism for estimating network distance, with Peer Name Resolution Protocol (PNRP), and more particularly to the invention provides a mechanism for incrementally updating network locality by recalculating network coordinates.

BACKGROUND OF THE INVENTION

The PNRP cache does not adequately take network proximity (locality) of nodes into account when adding most entries to the cache, and when routing messages in the global cloud. A message routed through H hops will, on average, travel half of the topological width of the cloud for each hop. If the network latency for such a hop is k seconds, this results in the resolve requiring 2*H*k seconds to traverse the network, as it must travel roughly the same path as a RESOLVE and a RESPONSE. Retransmits and local processing time are also factors in the overall RESOLVE time. In addition to increasing latency, the existing cache strategy results in greater internet-wide traffic than required. Messages on average are traversing half the internet on each hop. Accordingly, there is a need in the art to dramatically reduce in-transit time for PNRP resolution requests by applying locality metrics to all cache selection operations. The same scheme will encourage PNRP traffic to stay as local as possible, significantly reducing load on the internet as a whole.

SUMMARY OF THE INVENTION

In view of the foregoing, a method and computer product are provided for a host node in a computer network to determine its coordinates in a d-dimensional network space, comprising discovering an address of a peer node in the network, measuring network latency between the host node and the peer node, determining whether network latency has been measured for at least d+1 peer nodes, where, if network latency has not been measured for at least d+1 peer nodes, estimating the network coordinates of the host node, and where, if network latency has been measured for at least d+1 peer nodes, calculating the network coordinates of the host node using d+1 measured latencies. In one embodiment of the invention, the host node communicates with the peer node using peer-to-peer name resolution protocol (PNRP), and the address is a PNRP certified peer address. The certified peer address may include network coordinates for the peer node.

In another embodiment of the invention, the d-dimensional network space is a seven dimensional network space. Estimating the network coordinates may be performed using the Downhill Simplex method. Yet another embodiment of the invention may further comprise discovering a new peer node, measuring network latency between the host node and the new peer node, and recalculating the network coordinates of the host node base on the measured network latency of the new node. Still another embodiment of the invention may further comprise determining that the network coordinates of the host node and incorrect, discarding the network coordinates of the host node, selecting a subset of known peer nodes, measuring network latency between the host node and the subset of known peer nodes and recalculating the network coordinates of the host node using measured network latency.

Additional features and advantages of the invention are made apparent from the following detailed description of illustrative embodiments that proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1A:
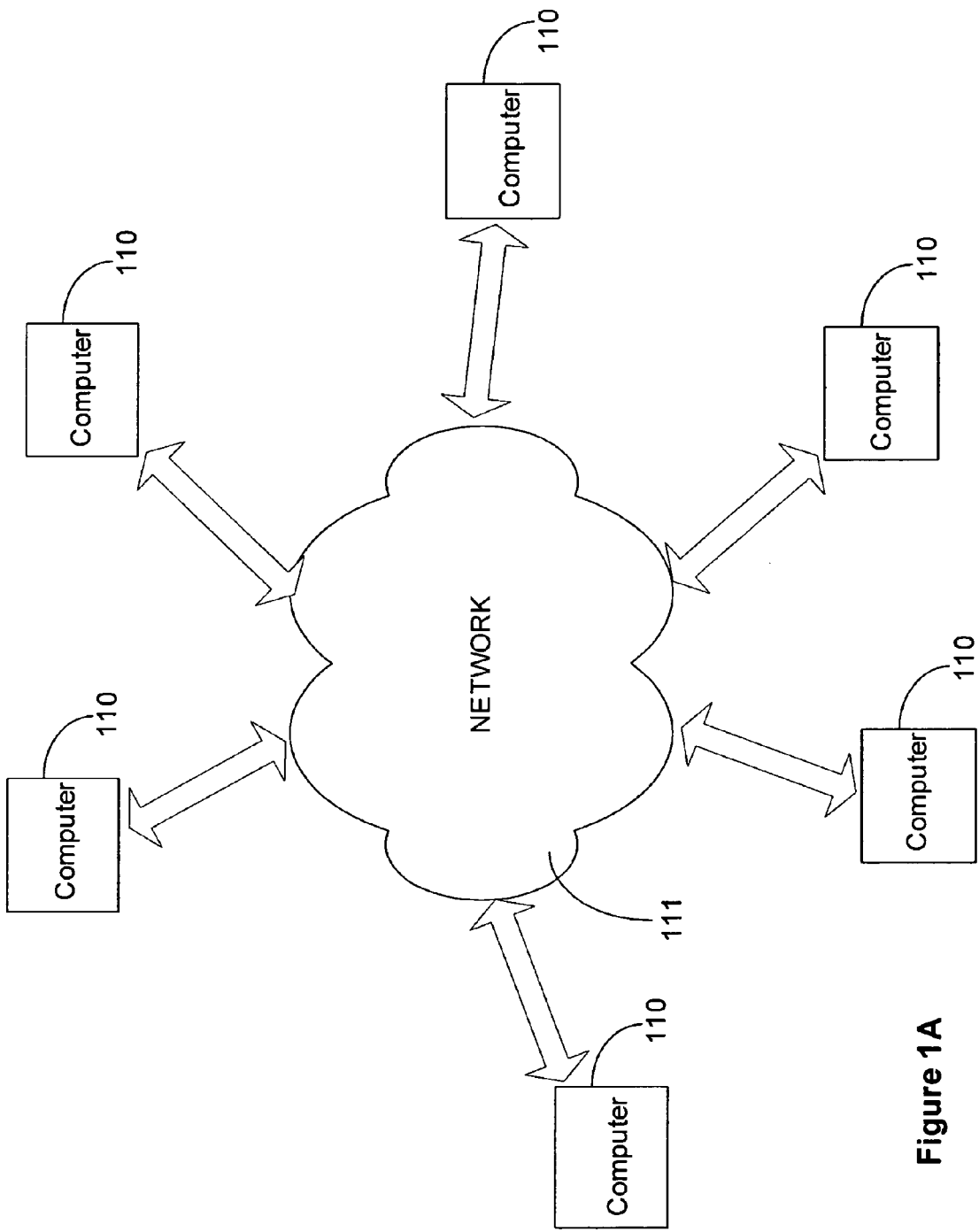
FIG. 1A is a schematic generally illustrating an exemplary network environment across which the present invention operates.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, or peers with respect to other computers. Accordingly, the various embodiments of the invention may be practiced on clients, network servers, peers, or combinations thereof, even though specific examples contained herein do not refer to all of these types of computers.

Figure 1B:
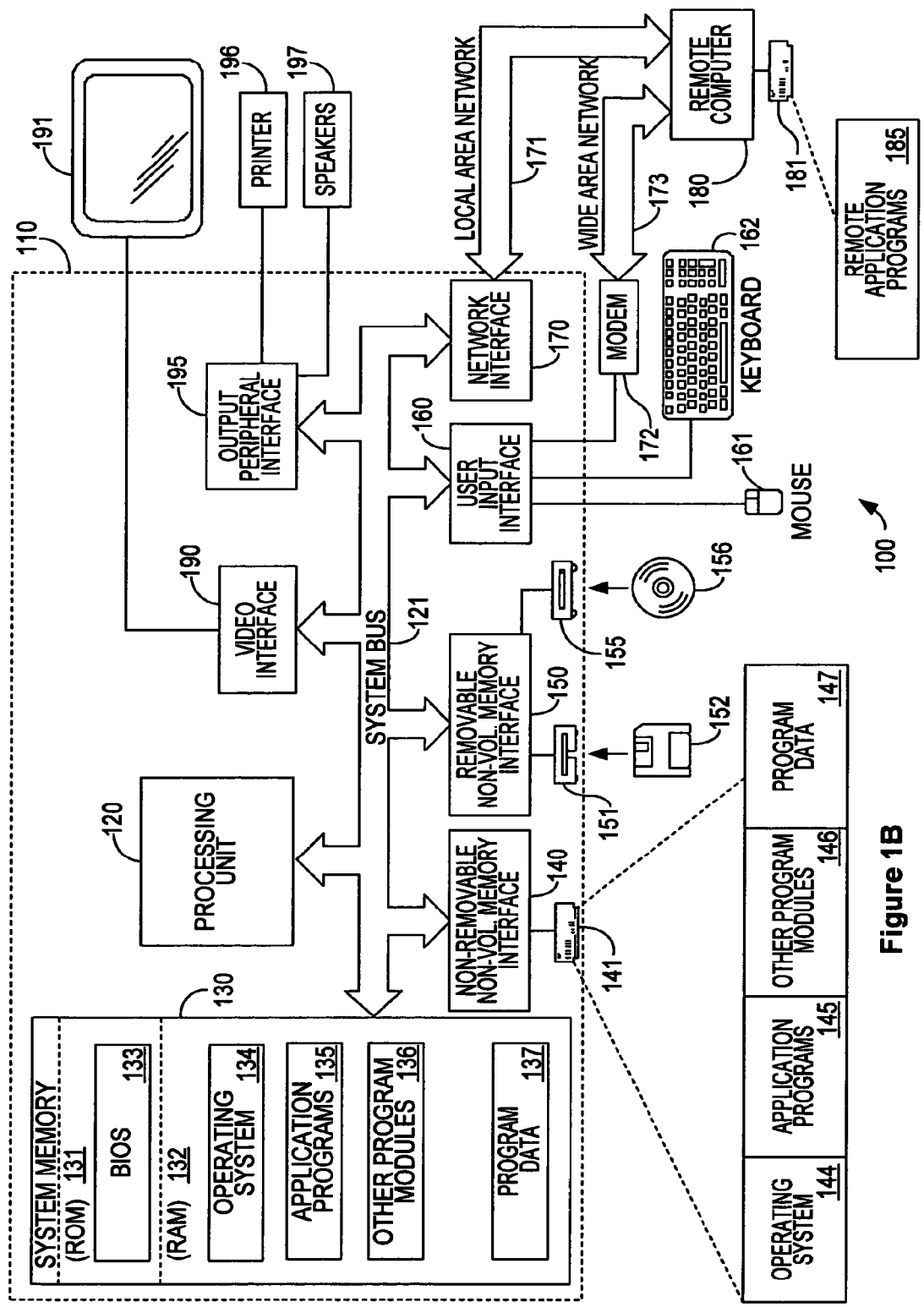
FIG. 1B is a block diagram generally illustrating an exemplary computer system on which the present invention resides.

FIG. 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1B, an exemplary system for implementing the invention includes a general-purpose computing device in the form of a computer 110, which may act as a client, network server, quarantine server, or peer within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 operates in a networked environment using logical connections to one or more remote computers, such as a remote computer 180. The remote computer 180 may be a personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks. Such networking environments are commonplace in offices, enterprise-wide computer networks, intranets, and the Internet. Furthermore, LAN 171 includes both wired and wireless connections.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

Figure 2:
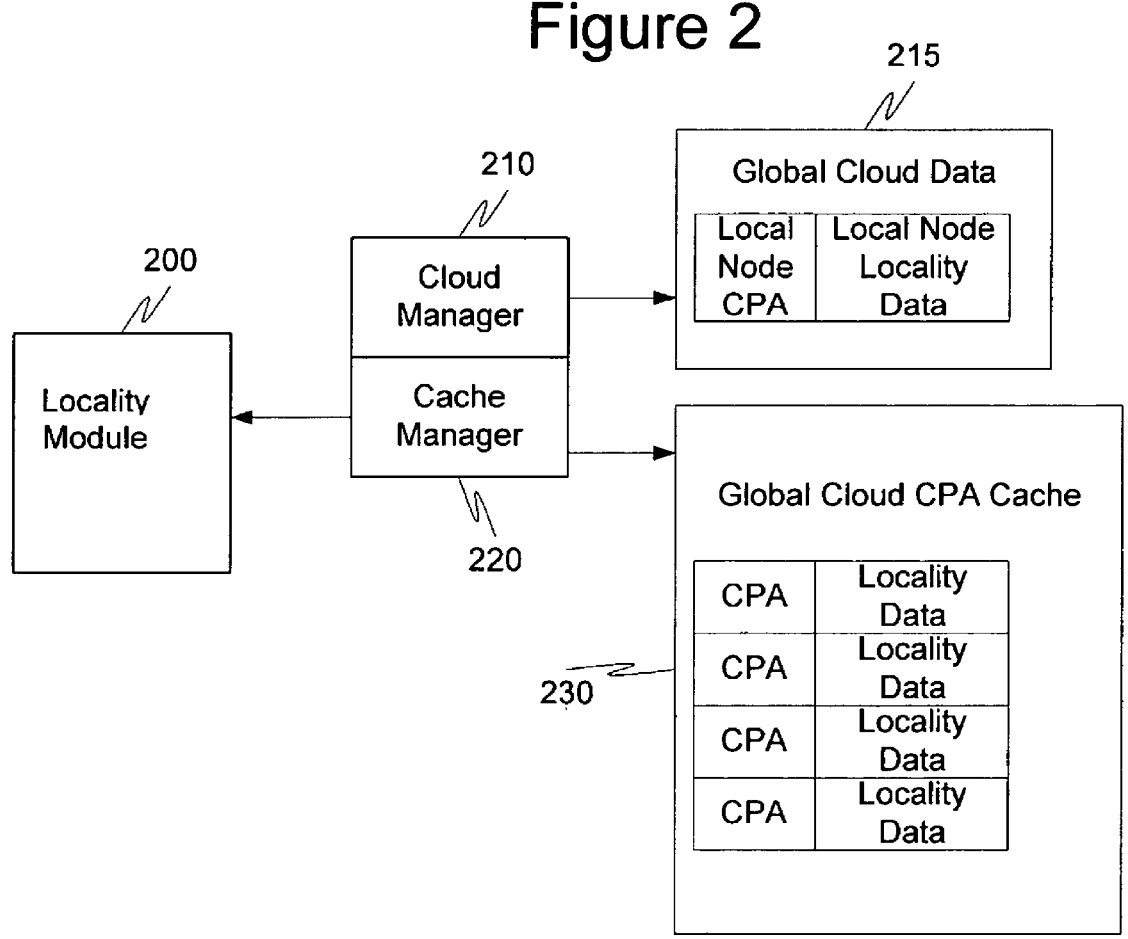
FIG. 2 is a diagram illustrating the components of the invention.

FIG. 2 illustrates a high-level architecture diagram of PNRP with the locality framework of the present invention. Locality module 200 provides a locality mechanism to the existing PNRP framework. Cloud manager 210 tracks the locality configuration for the local node, whether or not locality is enabled, and the name of the locality module if it is enabled. Cloud manager 210 stores the local node CPA and local node locality data in global cloud data store 215. Cache manager 220 tracks local node locality data, along with a state which indicates whether or not a valid locality estimation has been obtained from the locality framework. Each node has a single locality data instance per cloud. The cache manager 220 stores the locality data for each entry in the cache 230. In one embodiment of the invention, locality data is stored as part of the CPA. In another embodiment, locality data is stored separately in the cache 230. In one embodiment of the invention, the locality module 200 is a DLL that provides a utility routine used by the cloud manager 210 to generate the node's locality data, which is propagated with its CPA. The locality module 200 also provides a utility routine used by the cache manager 220 to measure relative locality between the node and any other node for which it has locality data. The locality module 200 further provides a utility routine for validating locality data received from other nodes, and for providing PNRP with information on the locality module.

Locality is inversely proportional to latency. In other words, the lower the latency between two nodes, the more local they are considered. In accordance with one embodiment of the invention, each locality-aware node assigns itself coordinates in a 7-dimensional space, based upon coordinates of other locality-aware nodes and measured latencies between itself and those nodes. In various embodiments of the invention, the number of dimensions for locality calculation may be between 7 and 12. Dimensionality of the coordinate space is configurable, but uniform throughout the cloud. To uniquely fix coordinates in a space of dimensionality d, a node requires d+1 data points.

Locality-aware nodes include their coordinates in 'locality data' whenever transmitting their CPA. They also propagate coordinates whenever transmitting the CPA of other locality-aware nodes. Non-locality-aware nodes are able to propagate locality coordinates they receive, since the coordinates will be either part of the CPA, or an additional message field which by default PNRP propagates without modification. Whenever evaluating a CPA for locality, the distance between the local node and the node publishing the CPA is estimated using simple Cartesian distance in the coordinate space. If each node's location estimate is relatively accurate, locality-based caches are constructed without requiring a probe to cached entries.

When bootstrapping, a new node adds a field to the SOLICIT specifying that it prefers locality-aware CPA's from the seed node's cache. The resulting ADVERTISE, when created by a node which understands locality, will specify which of the advertised CPA's include locality information. A locality-aware node attempts to obtain CPAs for at least d+1 locality-aware nodes to accurately estimate its position in network space, where d is the dimensionality of the coordinate space. However, the node may make preliminary estimates when it has less data, to facilitate cloud bootstrapping. This estimate is refined over time, so it is acceptable for the first estimate to be rough.

Suppose a node C is bootstrapping. If it is the first node in the cloud, it sets its coordinates to the origin—[32767, 32767, . . . , 32767] in a space using unsigned shorts for coordinates. Otherwise it performs coordinate estimation as follows. As each new CPA (from the bootstrap process) is received, the new node probes the CPA publisher to estimate latency. In one embodiment of the invention, the probe is an INQUIRE/AUTHORITY exchange. In another embodiment of the invention, the probe is a transport 'ping.' The probe results are stored along with the CPA. In order to minimize the impact of network irregularities on position estimation, at least three probes are performed.

For the first d+1 pieces of locality data the node receives, it refines its locality coordinates based on the new information. The node makes an initial estimate of its network location. In one embodiment of the invention, coordinate estimation is performed using the Downhill Simplex algorithm, a well-known simplex method for function minimalization. In other embodiments of the invention, an equivalent minimalization method may be used. If the calculation is under-constrained, Downhill Simplex will still result in a potential set of solutions corresponding to a hyperplane satisfying the known locality constraints. The locality module then chooses an arbitrary solution on this hyperplane. This will not adversely affect locality calculations, as it corresponds to selecting a rotation of potential solution coordinate spaces satisfying the known constraints. In the degenerate case (no other locality-aware nodes), a node places itself at the origin of the coordinate space.

Figure 3:
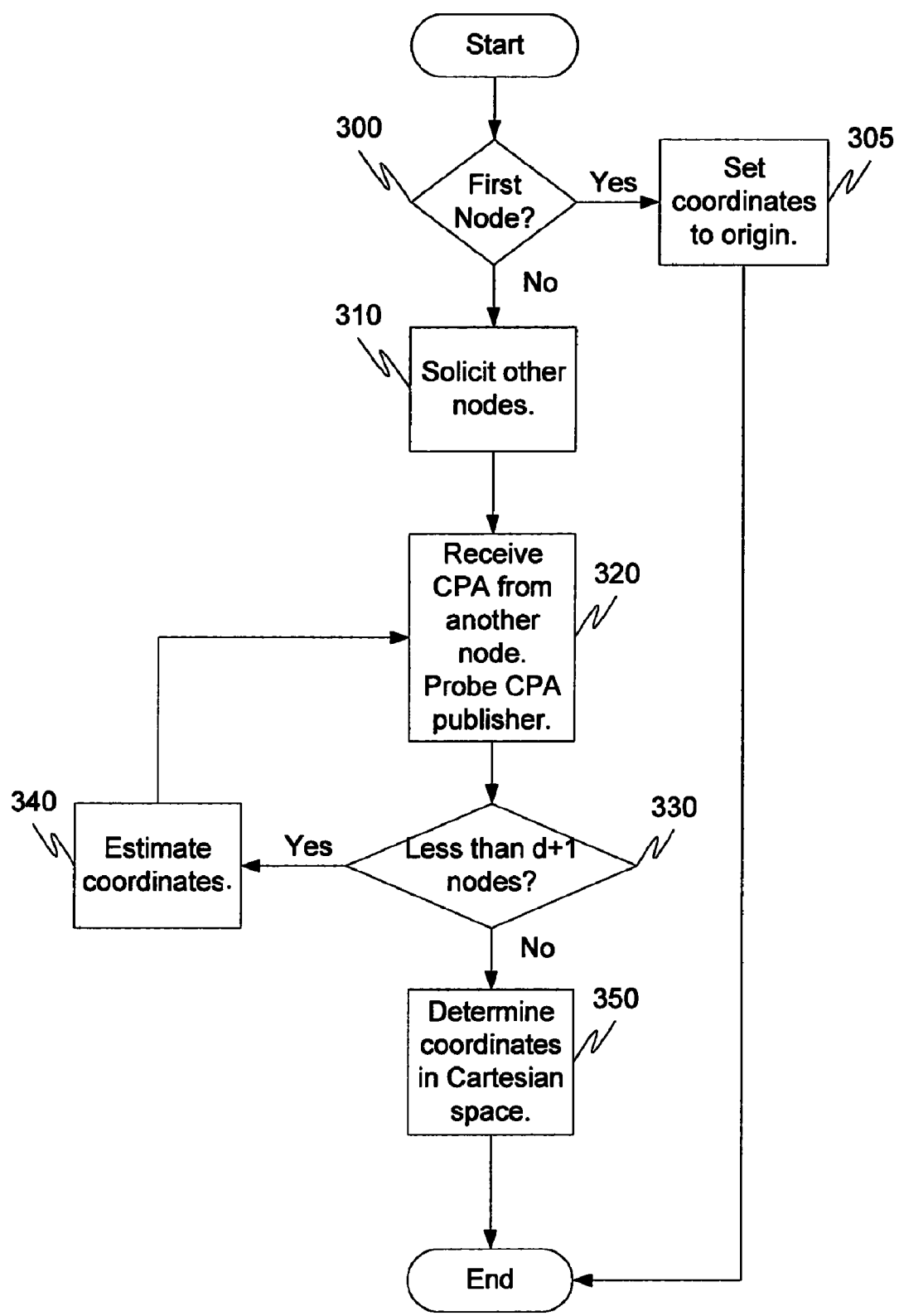
FIG. 3 is a diagram illustrating a coordinate determination method of the invention.

FIG. 3 is a flow diagram illustrating a method of coordinate estimation in accordance with the invention. At step 300, a node determines whether or not it is the first locality-aware node in the cloud. If so, the node sets its coordinates at the origin of the d-dimensional space at step 305. Otherwise, the node SOLICITs other locality aware nodes at step 310. At step 320, for each CPA received the node probes the publisher of the CPA to determine latency. The results are stored with the corresponding CPA. If the node has probe results for less than d+1 other nodes at step 330, the node estimates its coordinates using the presently acquired results with a minimalization function and continues to probe other nodes at step 340. If the node has probe results from at least d+1 nodes, the node determines its coordinates in the d-dimensional Cartesian space at step 350.

Over time a node learns about new locality-aware nodes, and culls or replaces some locality-aware entries in its cache. The node may perform an INQUIRE to estimate latency between itself and the other node. The measured latency is stored along with earlier probe results, allowing the node to periodically refine its estimated position in the coordinate space. Additional data points help to produce more accurate results over time.

After a major change in cloud topology, it may be necessary to reset the coordinate estimates. Coordinate estimate reset can be triggered by the following conditions:

Local address change. If the local node has moved to a new network, its topological relationship with other nodes may have changed.

Estimate/measurement disparity. As part of normal operation, the local node will learn of the actual RTT to nodes for which it can also estimate RTT. If a sufficient number of nodes have locality data which doesn't resemble the measured latency, then either the node is under attack, or the network has changed shape from the node's perspective.

Mobile IPv6 migration. If a mobile node moves to a new location, even though its address doesn't change, its coordinates should be updated. Note that this is not a concern for the foreseeable future, as mobile IPv6 is not a longhorn feature.

Cloud merge. If a PNRP cloud merge is triggered and the local node is helping repair the merge, it should recalculate its coordinates. If the separate clouds were originally part of the same cloud, coordinates should be valid. If the two clouds were never unified, they will have conflicting coordinate spaces, and one or both clouds will need to recalculate their coordinates.

Coordinate estimate reset is performed by re-measuring latency to a select subset of the cache. Latency is measured to the leafset as a "random location" subset, and to the closest (in terms of locality) nodes in the cache, usually kept in the top cache level. If additional measurements are required, they can be made to nodes contained in the second highest and second lowest cache levels, etc. The new coordinate calculations are made against at least d+1 nodes, and preferably more (such as 2d nodes) to improve accuracy. After calculating the new coordinates, sum of squares error between estimated and measured distances for the new calculations and the old calculations are compared for d+1 nodes. If the new error is similar to or less than the old error, coordinates for the space are still valid, and the new estimate should be used.

If the error is significantly greater, some of the coordinates used for coordinate estimation are most likely wrong, and therefore there has been a network or coordinate space reshaping. The new estimate is retained, and a timer is initiated to reset coordinates after a random interval, for example 180 to 300 seconds. During that interval, the local node receives updated CPAs from other nodes, which gives it a new pool of nodes to calculate coordinates against.

Locality relies upon having a cache containing nearby nodes. Establishing and maintaining such a cache requires changes to cache entry replacement logic. A cache replacement method for locality aware nodes follows. At step 1, a new CPA for a node X is received by a node C. At step 2, C compares X to active cache levels to determine which local cache level L X belongs in. Each cache level can hold up to 10 entries. It is divided into a 'left' and 'right' side (or hemisphere) of five entries each. Entries which are less than X modulo 2256 go in the left hemisphere, and entries which are greater than X modulo 2256 go in the right hemisphere. At step 3, C determines which hemisphere H node X belongs in. At step 4, if level L hemisphere H has at least one open slot, or is a lowest cache level, then no replacement is necessary, and the entry is added to the cache. Otherwise, follow the replacement algorithm to select an entry in L, H to replace.

At step 5, node C calculates the "ideal slot" for X in the cache, and finds the cached entry in L, H which is closest to occupying that slot. At step 6, node C checks to see whether H is trusted. If so, the new entry is discarded unless X is also trusted. At step 7, node C checks to see whether H or X have IPv6 address aggregators in common with the local node. If so, and those aggregators are not TEREDO addresses, then the common prefix is a stronger metric than latency, and the appropriate cache entry will be retained/added. If both H and X are equally preferred in terms of aggregator, node C proceeds to step 8. At step 8, node C acquires the measured round trip distance D for both H and X. If this distance is missing for either, but locality information is available, node C calculates the locality distance D of node X from node C. If insufficient information is available for this calculation, node C treats node X as further than all other cache entries with locality information.

At step 9, node C compares the locality distance D to the locality distance of the selected cache entry. Node C then caches the entry with the smaller distance at step 10. If probabilistic replacement is desired, probability can be generated depending upon relative locality distance of node X and the selected cache entry from node C. This approach significantly simplifies cache replacement.

A method of changing PNRP to include a locality-aware framework is presented. Those of ordinary skill in the art will understand that the locality mechanism described in this specification may be implemented without PNRP, or with a different peer name resolution protocol.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for a host node in a peer to peer computer network to determine its coordinates in a d-dimensional network space that uses Peer Name Resolution Protocol (PNRP), comprising, at the host node:

determining, by the host node, whether the host node is a first locality-aware node in the peer to peer computer network;

if the host node determines the host node is the first locality-aware node in the peer to peer computer network, setting a fist set of network coordinates of the host node to be an origin of the d-dimensional network space; and if the host node determines the host node is not the first locality-aware node in the peer-to-peer computer network:
discovering an address of a peer node in the PNRP network;
measuring network latency between the host node and the peer node based on results of a probe of a publisher of the address of the peer node;
storing, in an entry of a global cloud cache at the host node, locality data for the peer node and a state indicating whether or not a valid locality estimation has been obtained for the peer node;
determining a number of locality-aware peer nodes for which network latency has been measured, the number of locality-aware peer nodes for which network latency has been measured corresponding to a number of probe results stored in the global cloud cache;
if the number of locality-aware peer nodes for which network latency has been measured is less than d+1, estimating the first set of network coordinates of the host node;
if the number of locality-aware peer nodes for which network latency has been measured is greater than or equal to d+1, calculating the first set of network coordinates of the host node in the peer to peer network using d+1 measured latencies wherein closer locality-aware peer nodes to the host node will have a smaller network latency and closer network coordinates and locality-aware peer nodes that are further away from the host node will have a higher network latency and further network coordinates from the host node;
receiving a trigger for a coordinate reset;
selecting a subset of known locality-aware peer nodes based at least in part on levels in the global cloud cache;
re-measuring the network latency between the host node and each of the subset of known locality-aware peer nodes;
calculating a second set of network coordinates of the host node using re-measured network latency; and
using the second set of network coordinates of the host node when a first calculated error corresponding to the first set of network coordinates is greater than or equal to a second calculated error corresponding to the second set of network coordinates.

2. The method of claim 1, wherein the address is a PNRP certified peer address.

3. The method of claim 2, wherein the certified peer address includes network coordinates for the peer node.

4. The method of claim 1, wherein the d-dimensional network space is a seven dimensional network space.

5. The method of claim 1, wherein estimating the first set of network coordinates is performed using the Downhill Simplex method.

6. The method of claim 1, wherein measuring network latency is performed by measuring the time between sending a PNRP inquire message and receiving a PNRP authority message.

7. The method of claim 1, wherein measuring network latency is performed by measuring the time between a sent ping and a received ping.

8. A non-transitory computer-storage medium having computer executable instructions for performing steps for a host node in a peer to peer computer network to determine its coordinates in a d-dimensional Peer Name Resolution Protocol (PNRP) network space, the steps comprising:

determining, by the host node, whether the host node is a first locality-aware node in the peer to peer computer network;
if the host node determines the host node is the first locality-aware node in the peer to peer computer network, setting a first set of network coordinates of the host node to be an origin of the d-dimensional network space; and
if the host node determines the host node is not the first locality-aware node in the peer-to-peer computer network:
discovering an address of a peer node in the PNRP network;
measuring network latency between the host node and the peer node based on results of a probe of a publisher of the address of the peer node;
storing, in an entry of a global cloud cache at the host node, locality data for the peer node and a state indicating whether or not a valid locality estimation has been obtained for the peer node;
determining a number of locality-aware peer nodes for which network latency has been measured, the number of locality-aware peer nodes for which network latency has been measured corresponding to a number of probe results stored in the global cloud cache;
if the number of locality-aware peer nodes for which network latency has been measured is less than d+1, estimating the first set of network coordinates of the host node;
if the number of locality-aware peer nodes for which network latency has been measured is greater than or equal to d+1, calculating the first set of network coordinates of the host node in the peer to peer network using d+1 measured latencies wherein closer locality-aware peer nodes to the host node will have a smaller network latency and closer network coordinates and locality-aware peer nodes that are further away from the host node will have a higher network latency and further network coordinates from the host node;
receiving a trigger for a coordinate reset;
selecting a subset of known locality-aware peer nodes based at least in part on levels in the global cloud cache;
re-measuring the network latency between the host node and each of the subset of known locality-aware peer nodes;
calculating a second set of network coordinates of the host node using re-measured network latency; and
using the second set of network coordinates of the host node when a first calculated error corresponding to the first set of network coordinates is greater than or equal to a second calculated error corresponding to the second set of network coordinates.

9. The non-transitory computer-storage medium of claim 8, wherein the address is a PNRP certified peer address.

10. The non-transitory computer-storage medium of claim 9, wherein the certified peer address includes network coordinates for the peer node.

11. The non-transitory computer-storage medium of claim 8, wherein the d-dimensional network space is a seven dimensional network space.

12. The non-transitory computer-storage medium of claim 8, wherein estimating the first set of network coordinates is performed using the Downhill Simplex method.

13. The non-transitory computer-storage medium of claim 8, wherein measuring network latency is performed by measuring the time between sending a PNRP inquire message and receiving a PNRP authority message.

14. The non-transitory computer-storage medium of claim 8, wherein measuring network latency is performed by measuring the time between a sent ping and a received ping.

15. The method of claim 1, wherein the trigger for coordinate reset comprises at least one of:
- a local address change of the host node;
- a determined disparity between an actual round-trip time and an estimated round-trip time for a number of nearby peer nodes;
- an Ipv6 migration of the host node; or
- a repair of a cloud merge assisted, at least in part, by the host node.

16. The method of claim 1, further comprising when the second calculated error is greater than the first calculated error:
- initiating a timer for a random time interval;
- prior to an expiration of the timer, receiving an updated address from each of at least a portion of the subset of peer nodes and update the global cloud cache with information from the updated address; and
- upon expiration of the timer, initiating the trigger for coordinate reset.

17. The non-transitory computer-storage medium of claim 8, wherein the trigger for the coordinate reset comprises at least one of:
- a local address change of the host node;
- a determined disparity between an actual round-trip time and an estimated round-trip time for a number of nearby peer nodes;
- an Ipv6 migration of the host node; or
- a repair of a cloud merge assisted, at least in part, by the host node.

18. The non-transitory computer-storage medium of claim 8, wherein when the second calculated error corresponding to the second set of network coordinates is greater than the first calculated error corresponding to the first set of network coordinates, the steps further comprise:
- initiating a timer for a random time interval;
- prior to an expiration of the timer, receiving an updated address from each of at least a portion of the subset of peer nodes and update the global cloud cache with information from the updated address; and
- upon expiration of the timer, initiating the trigger for coordinate reset.

* * * * *